(12) United States Patent
Stapel et al.

(10) Patent No.: US 7,000,925 B2
(45) Date of Patent: Feb. 21, 2006

(54) MULTI-LAYERED CYLINDER HEAD SEAL

(75) Inventors: Klaus Stapel, Siegen (DE); Alan Retiere, Erkrath (DE)

(73) Assignee: Federal-Mogul Sealing Systems GmbH, (DE)

( * ) Notice: Subject to any disclaimer, the term of this patent is extended or adjusted under 35 U.S.C. 154(b) by 118 days.

(21) Appl. No.: 10/671,350

(22) Filed: Sep. 25, 2003

(65) Prior Publication Data

US 2004/0124588 A1 Jul. 1, 2004

(30) Foreign Application Priority Data

Sep. 26, 2002 (DE) ............................... 102 44 853

(51) Int. Cl.
*F02F 11/00* (2006.01)
(52) U.S. Cl. ..................... 277/593; 277/600; 277/595
(58) Field of Classification Search ........ 277/592–595, 277/600, 601
See application file for complete search history.

(56) References Cited

U.S. PATENT DOCUMENTS

| | | | | |
|---|---|---|---|---|
| 3,352,564 A | * | 11/1967 | Johnson | 277/593 |
| 4,480,844 A | * | 11/1984 | Kozerski | 277/591 |
| 4,531,750 A | * | 7/1985 | Herrington | 277/600 |
| 5,087,058 A | * | 2/1992 | Miura et al. | 277/595 |
| 5,120,078 A | * | 6/1992 | Udagawa | 277/591 |
| 5,255,926 A | * | 10/1993 | Udagawa | 277/595 |
| 5,360,219 A | * | 11/1994 | Okuda et al. | 277/592 |
| 5,683,092 A | * | 11/1997 | Ito et al. | 277/601 |
| 5,803,462 A | * | 9/1998 | Kozerski | 277/595 |
| 5,951,021 A | * | 9/1999 | Ueta | 277/593 |
| 5,979,907 A | * | 11/1999 | Udagawa et al. | 277/593 |
| 6,139,024 A | * | 10/2000 | Yakushiji et al. | 277/592 |
| 6,168,167 B1 | * | 1/2001 | Aoki | 277/595 |
| 6,676,134 B1 | * | 1/2004 | Wiegert et al. | 277/593 |

FOREIGN PATENT DOCUMENTS

| | | |
|---|---|---|
| DE | 19951530 | 10/2001 |
| JP | 591850 | 1/1984 |
| JP | 5964453 | 4/1984 |

\* cited by examiner

*Primary Examiner*—Alison K. Pickard
(74) *Attorney, Agent, or Firm*—Howard & Howard

(57) ABSTRACT

Multi-layered cylinder head seal, with a spacing layer that has openings corresponding to the number of combustion chambers taking cylinder bushings in a combustion engine, in the area of which a combustion chamber edging containing a soft iron ring is located, and in the edge areas at least partially limiting elements are provided, where the spacing layer is in functional contact with functional layers that have several selectable distances from both the associated combustion chamber edging as well as the associated limiting element and that are provided with sumps.

18 Claims, 1 Drawing Sheet

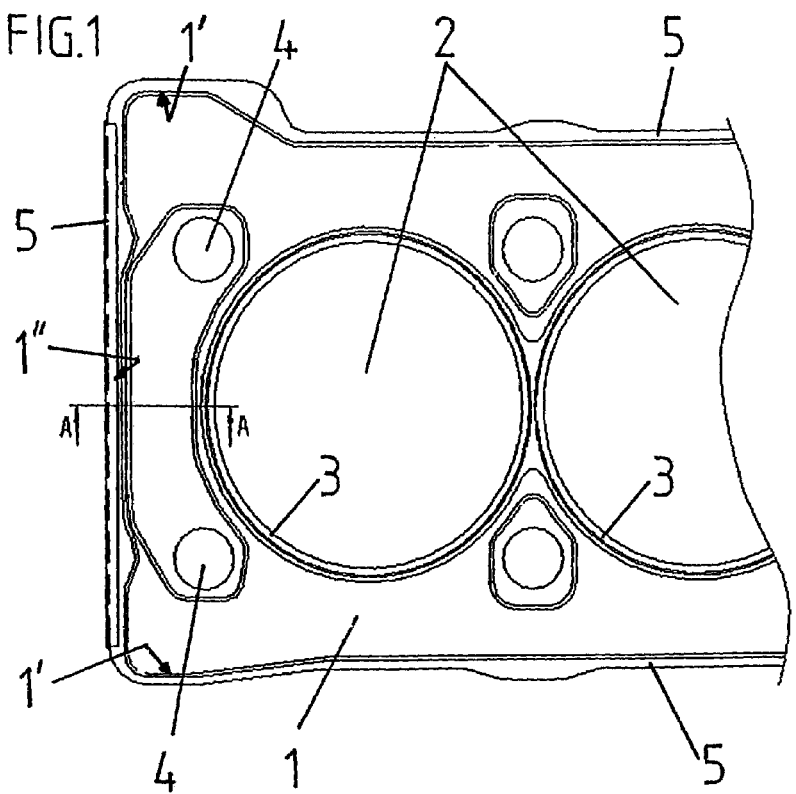
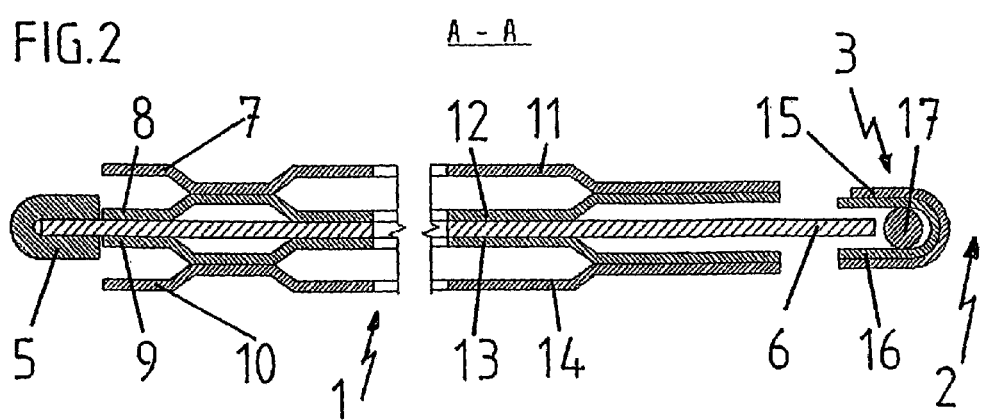

MULTI-LAYERED CYLINDER HEAD SEAL

BACKGROUND OF THE INVENTION

1. Technical Field

This application claims the benefit of German Patent Application No. 102 44 853.1, filed Sep. 26, 2002.

The invention consists of a multi-layered cylinder head seal, which has a several openings in it, the number corresponding to the number of combustion chambers in a combustion engine.

2. Related Art

A multi-layered cylinder head seal with openings corresponding to a number of combustion chambers in a combustion engine, and with a combustion chamber edging aligned with the opening, is to be extracted from the DE-A 199 51 530, where the combustion chamber edging includes at least one functional layer of the cylinder head seal, and a full sump of the functional layer is aligned within the combustion chamber edging. The cylinder head seal has a support that is aligned separately from the combustion chamber edging, where the support with the cylinder head seal, detached from the combustion chamber edging, is connected with at least one other layer of the cylinder head seal.

A cylinder head seal can be extracted from JP-U 59-1850 that, among other things, also includes a combustion chamber edging in the area of a cylinder bushing provided on the combustion chamber side.

In a similar manner, JP-U 59-64453 describes a multi-layered cylinder head seal that is also provided with a combustion chamber edging on the combustion chamber side.

For combustion engines with different heights of bushing protrusion, driven by tolerances, the multi-layered steel cylinder head seals that are typically used, which have a full bead for dynamic gas sealing, cannot always be used.

The full sumps are also not able, when the number of functional layers is increased, to compensate for the sometimes very great tolerances from bushing to bushing, in order to build up sufficient line press for gas sealing. Furthermore, due to the high bushing protrusion tolerances, bending and deformation of the functional layers can occur, which has a negative influence on the gas and media sealing, and leads to tears and fractures in the layer.

Also generally known are steel-elastomer cylinder head seals, with a combustion chamber edging for gas sealing and with elastomer beads for media sealing. Here, however, depending on the operating condition of the motor (temperature, shifting movements, part stretching) damage to the elastomer beads can occur. Elastomer beads are, as a rule, very sensitive to outside influences.

SUMMARY OF THE INVENTION

Multi-layered cylinder head seal, with a spacing layer that has openings corresponding to the number of combustion chambers taking cylinder bushings in a combustion engine, in the area of which a combustion chamber edging containing a soft iron ring is located, and in the edge areas at least partially limiting elements are provided, where the spacing layer is in functional contact with functional layers that have several selectable distances from both the associated combustion chamber edging as well as the associated limiting element and that are provided with sumps.

The invention addresses the task of preparing a cylinder head seal for combustion engines with tolerance-driven variable cylinder bushing protrusion, which also provides secure gas sealing for these combustion engines, but simultaneously has good oil and coolant sealing of the sumps.

This task is solved by a multi-layered cylinder head seal with a spacing layer that has in it a number of openings corresponding to the number of combustion chambers taking cylinder bushings in a combustion engine, in the area of which a combustion chamber edging containing a soft iron ring is positioned, and in the edge areas, at least partial limiting elements are provided, where the spacing layer is in effective contact with several selectable stand-offs with functional layers that have sumps for combustion chamber edging as well as for the associated limiting element.

Advantageous extensions of the object of the invention are to be taken from the subclaims.

With the object of the invention it is possible to seal on the gas side even combustion engines with cylinder bushings of differing protrusion heights well and with a long life. The combustion chamber edging is joined with the soft iron ring all around the spacing layer. This sets a gap specifically for the engine. The combustion chamber edging can thus move freely and is disconnected from the spacing layer with the functional layers provided on it. The functional layers with the half sumps are firmly connected to the spacing layer. The force balance is set by the associated number of functional layers provided with half sumps, and the thickness of the limiting elements (limiters), which are installed on the outer edges of the cylinder head seal. The necessary force balance is determined here by the bushing protrusion tolerances in each case.

BRIEF DESCRIPTION OF THE DRAWINGS

The object of the invention is shown in the drawing using an example application, and is described as follows. Shown are:

FIG. 1 Principle sketch of a cylinder head seal

FIG. 2 Cross section of the cylinder head seal per FIG. 1

DETAILED DESCRIPTION OF THE INVENTION

FIG. 1 shows, as a principle sketch, a cylinder head seal 1, which is provided with several openings 2 that are directed toward the later combustion chamber. In the area of the openings 2, combustion chamber edgings 3 are located. Further, clearance holes 4 are provided that serve to mount attachment elements. Additional clearance holes can be provided for carrying fluid media in the area of cylinder head seal 1. In the edge areas 1', 1" of the cylinder head seal 1, limiting elements (limiters) 5 are positioned.

FIG. 2 shows a cross section through a cylinder head seal 1 along the line A—A. The cylinder head seal 1 is, in this example, constructed of a spacing layer 6 made of sheet metal, as well as four functional layers 7, 8, 9, 10, that are also made of sheet metal. The functional layers 7 to 10 are equipped with half sumps 11, 12, 13, 14. In the area of the openings 2, the spacing layer 6 is surrounded by a combustion chamber edging 3 consisting of two sheet metal elements 15, 16, where the inner sheet metal element 16 is in functional contact with a soft iron ring 17. Through this measure, a gap is set specifically for the engine. In the outer edge area 1" of the spacing layer 6, a limiting element 5 is provided. The functional layers 7 to 10 are connected with selectably defined distances to the limiting element 5 on one side, and to the combustion chamber edging 3 on the other, with the spacing layer 6 (not shown). The combuschamber edging 3 is joined to the soft iron ring 17 all around the spacing layer 6, whereby the gap set specifically for the engine is adjusted. The combustion chamber edging 3 can thus move freely, and is disconnected from the spacing layer 6 as well as from the functional layers 7 to 10. The combustion chamber edging 3 created by the sheet metal elements 15, 16 ensures a good gas seal, even for combustion engines with cylinder bushings of varying height, while the functional layers 7 to 10 carrying half sumps 11 to 14 serve to seal out media in the area of the contact surface. The force balance hereby is set by the associated number of functional layers 7 to 10 and the thickness of the limiting element 5 (limiter).

What is claimed is:

1. A multi-layered cylinder head seal comprising:
    a spacing layer with openings corresponding to the number of combustion chambers having cylinder bushings in a combustion engine: combustion chamber edging containing a soft iron ring located around the openings; at least partially limiting elements provided at a peripheral edge of the spacing layer, where the spacing layer is in functional contact with sheet layers that have several selectable distances from both the associated combustion chamber edging as well as the associated limiting element and that are provided with beads.

2. The cylinder head seal per claim 1, characterized in that the functional layers are provided with half beads.

3. The cylinder head seal per claim 2, characterize in that at least one function layer is positioned in the area of each frontal surface of the spacing layer.

4. The cylinder head seal of claim 3, characterized in that two functional layers are positioned in the area of each frontal surface of the spacing layer, whose half beads are provided in selectable areas touching each other, and in other selectable areas at a distance from each other.

5. The cylinder head seal of claim 3, characterized in that the half beads are made open toward to the limiting elements.

6. The cylinder head seal of claim 2, characterized in that two functional layers are positioned in the area of each frontal surface of the spacing layer, whose half beads are provided in selectable areas touching each other, and in other selectable areas at a distance from each other.

7. The cylinder head seal of claim 6, characterized in that the half beads are made open toward to the limiting elements.

8. The cylinder head seal of claim 2, characterized in that the half beads are made open toward to the limiting elements.

9. The cylinder head seal per claim 1, characterize in that at least one function layer is positioned in the area of each frontal surface of the spacing layer.

10. The cylinder head seal of claim 9, characterized in that two functional layers are positioned in the area of each frontal surface of the spacing layer, whose beads are provided in selectable areas touching each other, and in other selectable areas at a distance from each other.

11. The cylinder head seal of claim 10, characterized in that the beads are made open toward to the limiting elements.

12. The cylinder head seal of claim 9, characterized in that the beads are made open toward to the limiting elements.

13. The cylinder head seal of claim 1, characterized in that two functional layers are positioned in the area of each frontal surface of the spacing layer, whose beads are provided in selectable areas touching each other, and in other selectable areas at a distance from each other.

14. The cylinder head seal of claim 13, characterized in that the beads are made open toward to the limiting elements.

15. The cylinder head seal of claim 1, characterized in that the beads are made open toward to the limiting elements.

16. The cylinder head seal of claim 1, characterized in that the associated combustion chamber edging is made of two sheet metal elements, where the inner sheet metal element accepts the soft iron ring and both sheet metal elements are joined all around the spacing layer.

17. The cylinder head seal of claim 1, characterized in that the combustion edging is movable relative to the spacing layer and is provided decoupled from both the spacing layer as well as the functional layers in the area of each opening.

18. The cylinder head seal of claim 1, characterized in that the functional layers are firmly connected to the spacing layer.

* * * * *

UNITED STATES PATENT AND TRADEMARK OFFICE
CERTIFICATE OF CORRECTION

PATENT NO. : 7,000,925 B2 Page 1 of 1
APPLICATION NO. : 10/671350
DATED : February 21, 2006
INVENTOR(S) : Klaus Stapel and Alan Retiere It is certified that error appears in the above-identified patent and that said Letters Patent is hereby corrected as shown below:

| Column | Line | |
|---|---|---|
| 3 | 18 | Replace "combustion engine:" with -- combustion engine; -- |
| 3 | 22 | Replace "with sheet layers" with -- with functional sheet layers -- |

Signed and Sealed this

Twenty-first Day of November, 2006

JON W. DUDAS
*Director of the United States Patent and Trademark Office*